United States Patent

Culver

[15] 3,668,426
[45] June 6, 1972

[54] DIFFERENTIAL PULSE HEIGHT DISCRIMINATOR

[72] Inventor: Richard B. Culver, Harris County, Tex.
[73] Assignee: Dresser Industries, Inc., Dallas, Tex.
[22] Filed: July 23, 1969
[21] Appl. No.: 844,014

[52] U.S. Cl..............................307/235, 307/286, 307/322, 328/115, 328/135
[51] Int. Cl........................................................H03k 5/20
[58] Field of Search..................307/235, 286, 322; 328/135, 328/115

[56] References Cited

UNITED STATES PATENTS

| 3,187,196 | 6/1965 | Corbell | 307/235 |
| 3,383,524 | 5/1968 | Garranan | 307/286 |
| 3,413,492 | 11/1968 | Schneider | 307/235 |
| 3,487,233 | 12/1969 | Rear | 307/235 |

OTHER PUBLICATIONS

IBM Tech. Dis. Bull., Cooper & Fritz, Vol. 6, No. 11, Apr. 1964.

Primary Examiner—Donald D. Forrer
Assistant Examiner—David M. Carter
Attorney—Robert W. Mayer, Daniel Rubin, Roy L. Van Winkle, Roderick W. MacDonald and William E. Johnson, Jr.

[57] ABSTRACT

A pair of transistors are each normally biased to saturation, one more strongly than the other. A tunnel diode connected between the collectors, respectively, produces an output voltage only when one of the transistors is driven out of saturation, but not when both transistors are non-saturated. Neither transistor is taken out of saturation until the signal pulse input reaches a certain predetermined amplitude. When the input pulse reaches a second predeterminde amplitude, both transistors are taken out of saturation. Thus, only pulses of amplitudes within a given range produce output signals. In an alternative embodiment, a single transistor replaces the tunnel diode. In another embodiment, the tunnel diode is replaced by a second differential pair of transistors.

10 Claims, 5 Drawing Figures

PATENTED JUN 6 1972 3,668,426

PRIOR ART

INVENTOR
RICHARD B. CULVER

William E. Johnson, Jr.
ATTORNEY

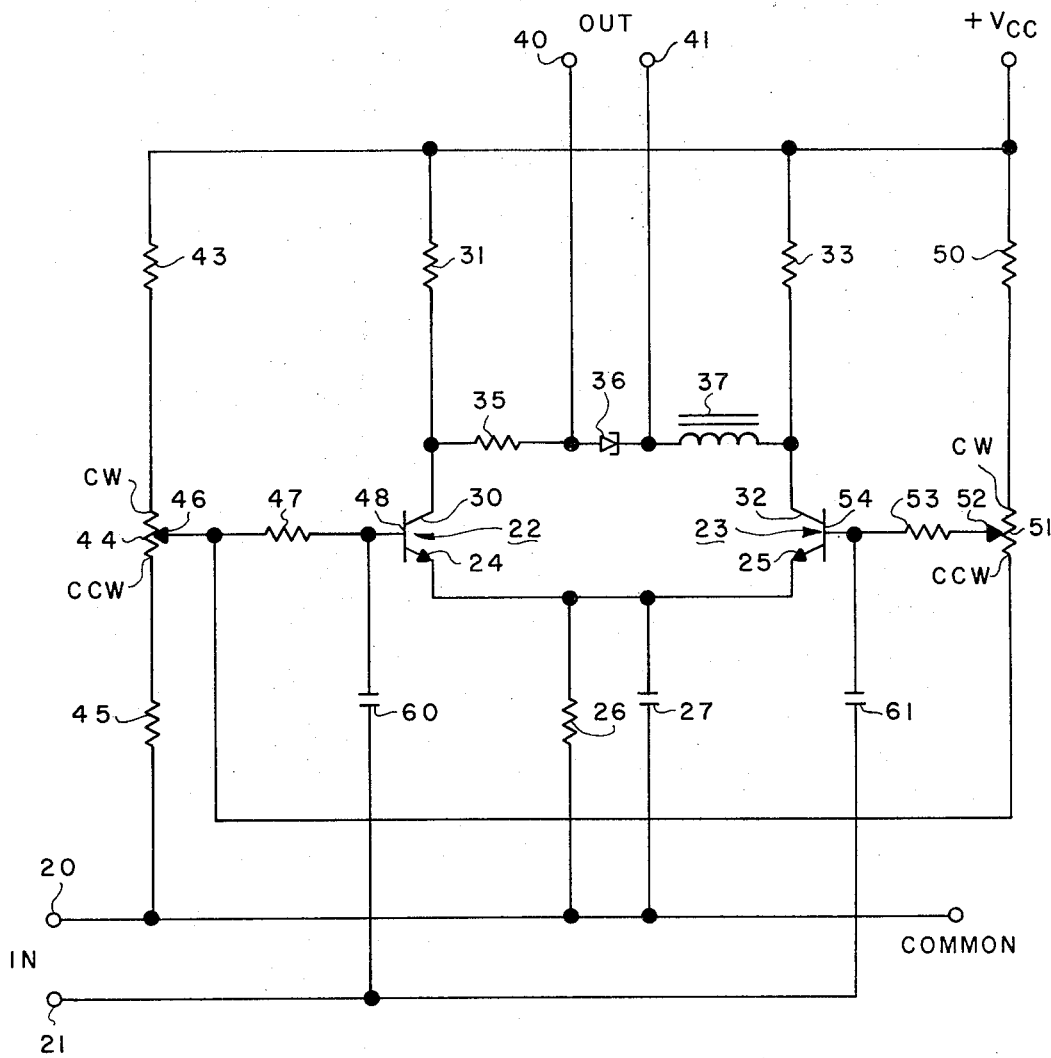

INVENTOR
RICHARD B. CULVER

ATTORNEY

DIFFERENTIAL PULSE HEIGHT DISCRIMINATOR

BACKGROUND OF THE INVENTION

This invention relates generally to an electronic circuit providing pulse height discrimination, and more specifically, to a circuit producing an output only when the input pulses exceed a first predetermined amplitude while being smaller than a second predetermined amplitude.

It has long been recognized as being desirable, especially in the art of radioactivity well logging, to be able to discriminate between pulses of varying pulse height. With such discrimination, one is able to make determinations relating to the energy of the radiation producing the pulses in the first instance. For example, with scintillation counters, it is possible to determine the energy of the incident radiation by observing the distribution in height of the pulses induced in the photomultiplier of the scintillation unit. This is due to the fact that for a given type of radiation, the size of the light flash emitted is a direct function of the energy transferred to the luminescent material.

Those in the art will recognize that differential pulse height discrimination refers to an operation upon the pulses which would accept, or reject as the case might be, all those pulses falling within a given range of amplitudes.

While the art has produced various schemes for providing pulse height discrimination, they have generally been bulky, having a fairly large number of components, and not readily suitable for compact, multichannel pulse height analysis systems. By way of example, many conventional differential pulse height discriminator circuits are comprised of three quite distinct components: a lower level discriminator, an upper level discriminator, and a coincidence detector. This particular prior art system is discussed at more length with respect to FIG. 1 of the drawings. Suffice it to say at this point that such a system is quite bulky and is generally undesirable for very compact, multichannel systems.

It is therefore the primary object of this invention to provide a new and improved pulse height discriminator circuit;

It is another object of the invention to provide a multichannel system having a plurality of such improved pulse height discriminator circuits; and It is yet another object of the invention to provide a pulse height discriminator circuit having a reduced number of components and which is readily adaptable to compact operation.

The objects of the invention are accomplished, broadly, by the provision of a circuit utilizing a tunnel diode with the non-inverted output characteristic of a saturated transistor to perform both discrimination and coincidence detection. In the preferred embodiment, the tunnel diode is connected between the collectors, respectively, of the transistor pair, each transistor being normally biased to saturation. By having the transistors biased differently, one transistor is driven out of saturation with a lower input signal than the other. If the signal amplitude is too high, both transistors are taken out of saturation and no signal output is developed.

These and other objects, features and advantages of the present invention will become more readily apparent after reading the following detailed description in conjunction with the drawing, in which:

FIG. 2 is a circuit diagram of a differential pulse height discriminator according to the invention;

Figure 1:
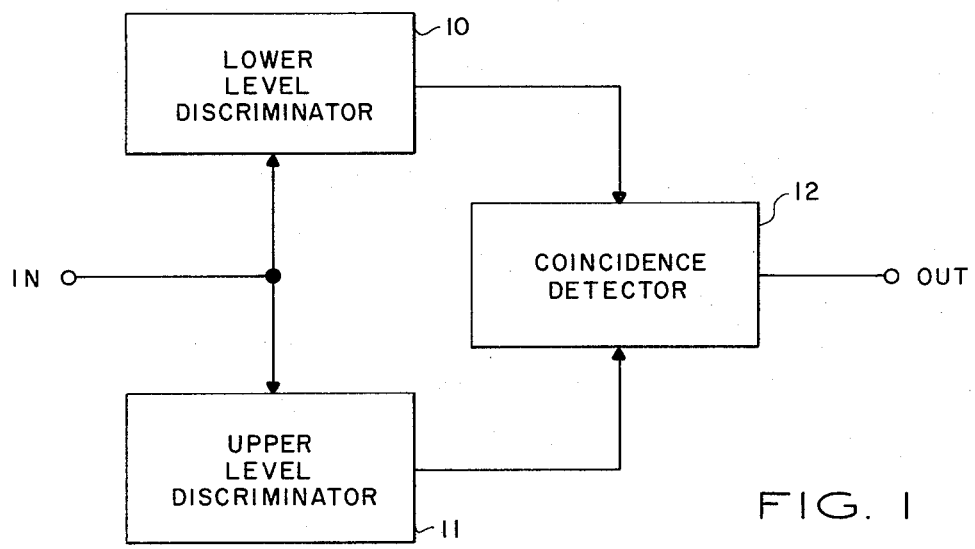
FIG. 1 is a block diagram of a prior art circuit for a differential pulse height discriminator.

Referring now to the drawing, specifically to FIG. 1, there is illustrated a block diagram of a conventional circuit used by those in the art to provide differential pulse height discrimination. Such prior art systems normally consist of three distinct circuits, namely, a lower level discriminator circuit 10, an upper level discriminator circuit 11 and a coincidence detector circuit 12. In such systems, the lower and upper level circuits 10 and 11 are quite often identical in nature. In their operation, it should be appreciated that no output signal is forthcoming from the coincidence detector 12 unless the input pulse is higher than the lower level and lower than the upper level. As discussed heretofore, such prior art systems are quite bulky, have many components, and are generally unsuitable for use in a multichannel pulse height analysis system, especially if costs and space are prime considerations.

FIG. 2 illustrates a circuit diagram of the preferred embodiment of the invention. A pair of input terminals 20 and 21 is arranged as to be capable of receiving input pulses of varying amplitude, the terminal 20 being common or ground. A pair of transistors 22 and 23 have their respective emitters 24 and 25 connected together. The emitters 24 and 25 are also connected to a common junction of resistor 26 and capacitor 27, the other end of resistor 26 and capacitor 27 being connected to the common bus.

The collector 30 of transistor 22 is connected through load resistor 31 to the collector power supply ($V_{cc}$), whereas, the collector 32 of transistor 23 is connected through load resistor 33 to the $V_{cc}$ supply. Serially connected between the collectors 30 and 32 are a resistor 35, a tunnel diode 36 and an inductor 37. The output terminals 40 and 41 are taken off the ends of the tunnel diode 36.

Serially connected between the $V_{cc}$ supply and common are resistor 43, potentiometer 44 and resistor 45, the sliding arm 46 of potentiometer 44 being connected through resistor 47 to the base 48 of transistor 22.

Serially connected between the $V_{cc}$ supply and the sliding arm 46 are resistor 50 and potentiometer 51. The sliding arm 52 of potentiometer 51 is connected through resistor 53 to the base 54 of transistor 23.

The input terminal 21 is coupled through capacitors 60 and 61 to the base 48 and base 54 of transistors 22 and 23, respectively.

In the operation of the circuit of FIG. 2, it should be appreciated that the bias of transistor 22 is established by the $V_{cc}$ power supply in conjunction with resistors 43, 44, 45, and 47. The bias for transistor 23 is established by the $V_{cc}$ power supply and resistors 50, 51, 53, 44, and 45.

In adjusting the circuit for reception of input pulses at terminals 20 and 21, potentiometer 51 is set full counter-clockwise (ccw) and potentiometer 44 is adjusted until transistors 22 and 23 are both barely in saturation. Potentiometer 51 is then moved to some position in the clockwise (cw) direction, thus establishing a range for the circuit as a whole. With such a bias arrangement, the bias current supplied to the base of transistor 23 will always be equal to or greater than the bias current supplied to the base of transistor 22.

Assume now that a negative (with respect to common) input pulse is applied to terminal 21. The pulse is coupled through the capacitor 60 to the base 48 of transistor 22 and attempts to overcome the bias voltage applied thereto. If the pulse is of sufficient amplitude, transistor 22 is taken out of saturation and the collector current of transistor 22 will swing accordingly. As the collector goes positive, the current through the tunnel diode increases. Once the tunnel diode current has increased sufficiently, the diode switches into its negative conduction region, thus producing an output at terminals 40 and 41.

Input pulses applied to terminal 21 which are of insufficient amplitude will keep transistor 22 from going out of saturation. In a similar manner, since transistor 23 is even more strongly biased, such small pulses will keep transistor 23 from leaving its saturated state.

If the input pulses have an amplitude sufficient to take both transistors out of saturation, both collectors will swing positive and no output will be developed across the tunnel diode.

Thus, it should be appreciated that the lower level of discrimination can be set by potentiometer 44 and the upper level of discrimination can be set by potentiometer 51. However, the resistor values could be selected in advance and eliminate the setting of the potentiometers. Likewise, one could use a single potentiometer in conjunction with fixed resistors if desired. It is deemed preferable to have matched Beta (hfe) characteristics for the transistors.

Resistor 35 and inductor 37 can be of various values, but should be chosen appropriately to control the width of the output pulses appearing at terminals 40 and 41.

It has been found that by using transistors with low saturation resistance, input pulses in the range of 25 mv to 500 mv can be resolved. Although not illustrated, it should be appreciated that the output terminals 40 and 41 could be coupled through a second differential pair of transistors for further amplification if desired.

Although the circuit of FIG. 2 has been illustrated and described as using negative input pulses with NPN transistor pairs, the circuit could be modified to handle positive pulses by using PNP-transistors with a negative $V_{cc}$ supply.

Thus there has been described with respect to FIG. 2 a circuit whereby input pulses of varying amplitude can be applied to produce corresponding output pulses only when the input pulses fall within a predetermined range of amplitudes.

In analyzing the theory of operation of the circuit of FIG. 2, it should be appreciated that with a transistor biased in saturation, i.e., VCE less than VBE, small amplitude pulses fed to the base cause corresponding collector pulses of the same polarity. That is, there is no phase inversion. As the input pulses are increased in amplitude, the collector pulses decrease in amplitude until the input pulses are large enough to overcome the bias and take the transistor out of saturation. At this point, the pulses are amplified in the normal manner and the collector, in the case of FIG. 2, would swing positive. Thus, with a larger bias, the larger the pulse required to take the transistor out of saturation.

Figure 3:
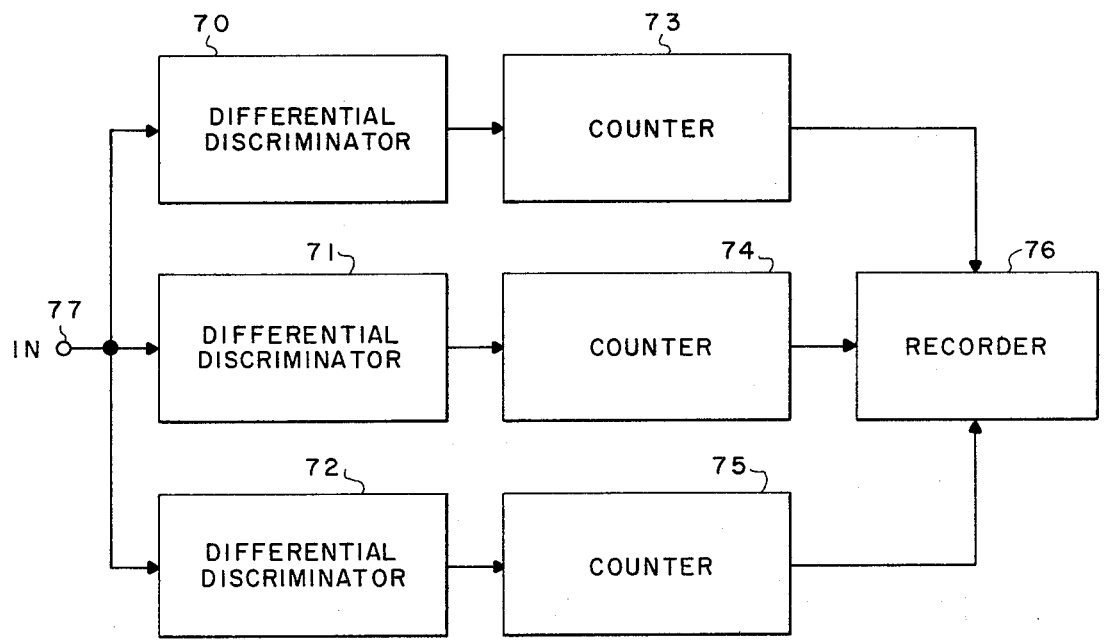
FIG. 3 is a block diagram of a multichannel pulse height analysis system employing a plurality of the discriminator circuits according to FIG. 2.

Referring now to FIG. 3, there is illustrated a plurality of differential discriminator circuits 70, 71, and 72, each of which is made in accordance with the circuit of FIG. 2. The outputs of the circuits 70, 71, and 72 are connected, respectively, to the counter circuits 73, 74, and 75. The counter circuits are conventional and could be, for example, comprised of appropriately connected flip-flops, gates and registers if desired. Such circuits are described at length in *Digital Computer Principles*, pp. 291–307, McGraw Hill Book Company, 1962.

The outputs of the counters 73, 74, and 75 are connected to the recorder 76, for example, a recording oscillograph.

Input terminal 77 is connected to the circuits 70, 71, and 72, whereby the incoming pulses may be operated upon in a manner heretofore described with respect to FIG. 2. In the embodiment of FIG. 3, however, it is contemplated that each of the discriminator circuits would cover different amplitude ranges to thus provide multichannel pulse height analysis. For example, the three discriminator circuits could be set to cover ranges of 100–200 mv, 200–300 mv and 300–400 mv if desired. Likewise, the ranges could be set to overlap, as, by example, 100–200 mv, 150–250 mv and 200–300 mv. It should be further appreciated that a larger or even smaller number of channels (discriminators) could be used in the system and that the number three was merely chosen for exemplary purposes.

Figure 4:
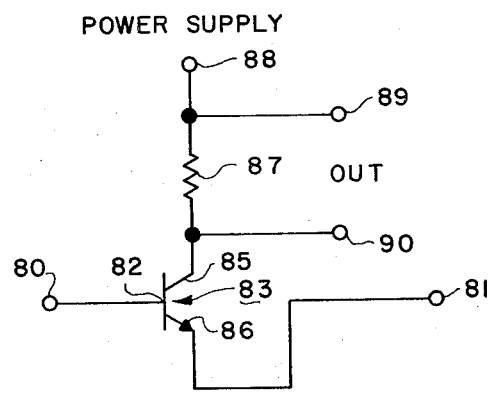
FIGS. 4 and 5 are alternative embodiments for the tunnel diode portion of FIG. 2.

FIG. 4 illustrates an alternative embodiment for a portion of the circuit of FIG. 2 wherein the resistor 35, tunnel diode 36 and inductor 37 are replaced by the circuit between junctions 80 and 81. The base 82 of transistor 83 is coupled to the junction 80. The emitter 86 of transistor 83 is connected to terminal 81. The collector 85 is connected through a load resistor 87 to a power supply 88 which would preferably be a higher voltage than the $V_{cc}$ voltage. The output terminals 89 and 90 are taken across the load resistor 87.

In the operation of the circuit of FIG. 4, consider that when the lower level amplitude is exceeded in FIG. 2 and transistor 22 is taken out of saturation, the collector 30 (and junction 80 of FIG. 4) swings positive. This swing is amplified by transistor 83 and a voltage pulse is developed across the load resistor 87 and hence the output terminals 89 and 90. If, however, the input pulse is too large, transistor 23 is also taken out of saturation and junction 81 also swings positive, thus eliminating the voltage drop across resistor 87. It should thus be appreciated that a voltage output at terminals 89 and 90 will only be seen whenever the input signals fall within a predetermined range of amplitude.

Figure 5:
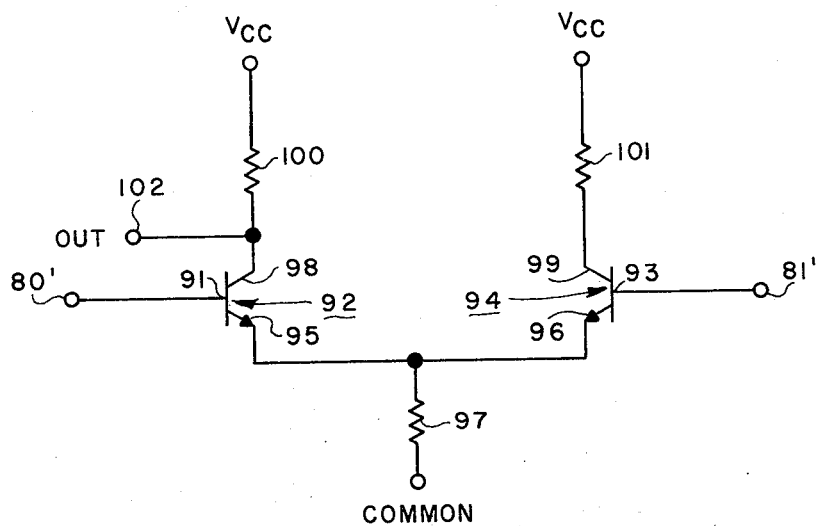

FIG. 5 illustrates still another circuit to replace the tunnel diode 36, resistor 35 and inductor 37 of FIG. 2. In this instance, the junction 80' corresponds electrically to junction 80 of FIG. 4 and junction 81' corresponds electrically to junction 81 of FIG. 4.

The junction 80' is coupled to the base 91 of transistor 92, whereas junction 81' is coupled to the base 93 of transistor 94. The respective emitters 95 and 96 are connected together and to common through a resistor 97. Each of the collectors 98 and 99, respectively, is coupled through load resistors 100 and 101 to the $V_{cc}$ supply. The output terminal 102 is taken off collector 98 with respect to common. If desired, the output could also be taken off collector 99.

In the operation of the circuit of FIG. 5, it should be appreciated that when the transistor 22 of FIG. 2 is taken out of saturation, junction 80' swings positive, thus causing a negative swing on collector 98 and output terminal 102. If, however, transistor 23 is also taken out of saturation, terminal 81' also goes positive, causing the emitter 96 to go positive and thus emitter 95 goes positive, such action preventing the output from appearing at terminal 102. Thus, no output will appear at terminal 102 unless the input pulses fall within a predetermined range of amplitudes. Although FIG. 5 is illustrated in a somewhat simple manner, one or both of the transistors 92 and 94 could be biased in various ways known to those skilled in the art to effect similar results.

It should thus be appreciated that there has been described herein the preferred embodiments of a differential discriminator circuit, as well as a system using a plurality of such circuits. However, modifications of this invention other than those herein suggested will become apparent to those of ordinary skill in the art after reading this disclosure. Therefore, it is intended that the matter in the foregoing description and accompanying drawings be interpreted in an illustrative sense, and not in a limiting sense.

The embodiments of the invention in which an exclusive property or privilege is claimed are defined as follows:

1. A circuit for providing differential discrimination as to pulse amplitude comprising:
    a. a first transistor biased to a first conductive state of saturation;
    b. a second transistor biased to a second conductive state of saturation, said second transistor being biased to saturation more heavily than said first transistor;
    c. input circuit means connected to each of said transistors whereby input pulses can be applied thereto to affect the conductive states of said transistors; and
    d. detection means connected between said transistors for providing a signal output responsive to said first transistor being removed from saturation by an input pulse having an amplitude within a predetermined range of amplitudes while said second transistor remains in saturation.

2. The circuit according to claim 1 wherein said detection means comprises a tunnel diode.

3. The circuit according to claim 2 including in addition thereto a resistor and an inductor connected in series with said tunnel diode to provide pulse shaping of the signal output developed across said tunnel diode.

4. The circuit according to claim 1 wherein said detection means comprises a third transistor arranged to be conductive responsive to said first transistor being taken out of saturation.

5. The circuit according to claim 1 wherein said detection means comprises a third and a fourth transistor together connected as a differential pair, said third transistor being arranged to be conductive responsive to said first transistor being taken out of saturation while said fourth transistor remains non-conductive responsive to said second transistor remaining in a state of saturation.

6. A circuit for providing differential discrimination as to pulse amplitude comprising:
   a. a first transistor biased to a first conductive state of saturation;
   b. a second transistor biased to a second conductive state of saturation, said second transistor being biased to saturation more heavily than said first transistor;
   c. input circuit means connected to each of said transistors whereby input pulses can be applied thereto, whereby an input pulse can either cause each of the transistors to remain in saturation, or cause only the first transistor to be taken out of saturation, or cause each of the transistors to be taken out of saturation; and
   d. coincidence-indicative detection means connected between said transistors.

7. The circuit according to claim 6 wherein said detection means comprises a tunnel diode.

8. The circuit according to claim 7 including in addition thereto a resistor and an inductor connected in series with said tunnel diode to provide pulse shaping of the signal output developed across said tunnel diode.

9. The circuit according to claim 6 wherein said detection means comprises a third transistor arranged to be conductive responsive to said first transistor being taken out of saturation.

10. The circuit according to claim 6 wherein said detection means comprises a third and a fourth transistor together connected as a differential pair, said third transistor being arranged to be conductive responsive to said first transistor being taken out of saturation while said fourth transistor remains non-conductive responsive to said second transistor remaining in a state of saturation.

* * * * *